June 5, 1956 P. G. HANSEL 2,749,515
DIRECT-READING FREQUENCY METER
Filed Dec. 9, 1950
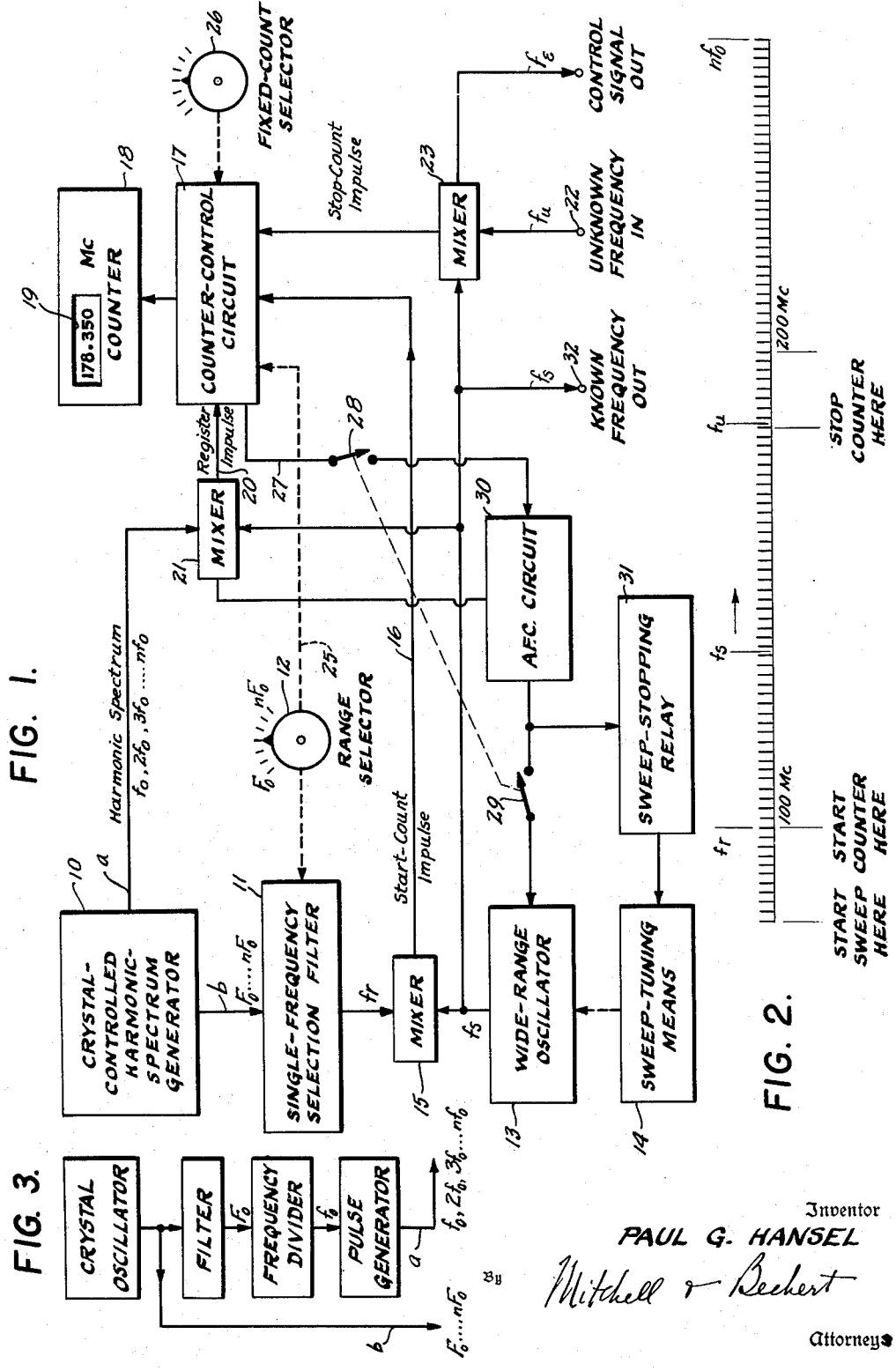
Inventor
PAUL G. HANSEL
By Mitchell & Bechert
Attorneys

United States Patent Office 2,749,515
Patented June 5, 1956

2,749,515

DIRECT-READING FREQUENCY METER

Paul G. Hansel, Greenvale, N. Y., assignor to Servo Corporation of America, New Hyde Park, N. Y., a corporation of New York Application December 9, 1950, Serial No. 200,060

7 Claims. (Cl. 324—79)

My invention relates to a secondary frequency standard, as for frequency-metering applications.

It is an object of the invention to provide an improved device of the character indicated.

It is another object to provide an improved direct-reading frequency meter adapted for the measurement of unknown frequencies and for the comparison of frequencies.

It is also an object to provide an improved reference-frequency generator to deliver a known frequency as a secondary standard.

Another object is to provide an improved means for the provision of error signals, representing frequency deviations of a given signal from a reference signal (of known frequency), as for application to the stabilized frequency control of the first-mentioned signal.

It is a still further object to provide a secondary frequency standard or meter requiring no point-by-point calibration procedures.

It is a general object to meet the above objects with a frequency meter capable of indicating directly, to any arbitrarily desired resolution, the frequency of an injected signal, the operation being entirely automatic and the equipment relatively simple.

Other objects and various further features of the invention will become apparent or will occur to those skilled in the art from a reading of the following specification in conjunction with the accompanying drawings. In said drawings, which show, for illustrative purposes only, a preferred form of the invention—

Fig. 1 is a schematic layout of a frequency meter incorporating features of the invention;

Fig. 2 graphically depicts a frequency-scanning and counting operation in the device of Fig. 1; and Fig. 3 schematically illustrates one form of the spectrum generator in Fig. 1.

Briefly stated, my invention contemplates establishment of a spectrum of harmonic frequencies to be used as reference frequencies. This spectrum may be based upon a single crystal oscillator so that all harmonics may reflect the accuracy of the single crystal; the spectrum may include harmonics of a submultiple of the base frequency of the crystal. Frequency-responsive spectrum-probing means, which may include a free-running search oscillator, may be tuned continuously over a frequency range including a band within the said harmonic spectrum, and a counter may respond to frequency coincidences between the tuned condition of the probing means and the spectrum of harmonic frequencies, so as to count the number of such coincidences for a particular tuning search or sweep probling means. In use as a frequency meter, that is, when it is desired to measure an unknown frequency, the probing means may be caused panoramically to scan a given part of the harmonic spectrum, with the counter responding to the number of harmonics traversed by the probing sweep. When the oscillator reaches the unknown frequency, the counter responds to the latter coincidence to stop further counting, and the final count is preserved as a frequency indication.

To simplify the counting procedure, the invention additionally provides a narrow band-pass filter capable of selecting a particular one of the harmonics in the harmonic spectrum, and the coincidence between the tuned probe condition and the filter-selected frequency may be utilized to derive a reference signal to start operation of the counter. Thus, the counter need only respond to the number of harmonics traversed in the total sweep, beginning at the filter-selected harmonic and extending to the harmonic immediately preceding the unknown frequency.

In use as a secondary frequency standard, manual means may be provided in conjunction with the counter to select a particular frequency, and the tunable probing means may be caused to sweep over the spectrum until the counter has attained the count which has been preselected as representing the desired signal frequency. Upon attainment of this count, an automatic frequency-control circuit may be activated so as to stop further sweep of the probing means and to stabilize the oscillator at the then-attained particular harmonic frequency.

In use as an error-signal generator, as for slaving a transmitter oscillator to a given selected secondary-standard source frequency, the transmitter-oscillator output frequency may be mixed with the above mentioned preselected secondary-standard source frequency, and known means may respond to the resulting beat frequency to derive an error or deviation signal.

Referring to the drawings, a harmonic spectrum may be generated by a crystal-controlled harmonic-spectrum generator 10 delivering a spectrum of signals. Each signal may be of a different frequency, but having an integral harmonic relationship to the basic crystal frequency $F_0$. A suitable technique to provide such a spectrum is illustrated schematically in Fig. 3; according to this technique, and depending upon the desired resolution of the device, a particular submultiple of the natural crystal frequency $F_0$ is selected, and the harmonics of the resulting submultiple frequency $f_0$ are employed. As a means for arbitrarily selecting a base frequency from which the counting function is to operate, I provide a single-frequency selection filter 11, which may be a narrow band-pass filter having a pass band that is preferably no greater than the frequency spacing between adjacent harmonics in the spectrum of generator 10. The filter 11 may be of a manually tuned variety, and the setting of the control knob 12 may determine various levels (as, for example, given multiples of the basic frequency $F_0$ of the crystal) of single-frequency selection within the total spectrum of generator 10, depending upon the general region within the spectrum in which the unknown frequency $f_u$ lies or is thought to lie. The output of the filter 11 may thus be a selected reference frequency $f_r$.

In order panoramically to scan or sweep the spectrum of generator 10, I employ frequency-responsive spectrum-probing means which may include a tuned circuit with means for sweeping the tuned frequency thereof throughout the harmonic spectrum and with detector means responsive to frequency coincidences in the harmonic spectrum; however, in the present form, I provide a free-running oscillator 13, which may employ conventional sweep means 14, such as a motor drive on the oscillator tuning capacitor, or a reactance tube controlled by a sweep circuit. The output of oscillator 13 may be combined in a non-linear element or mixer 15 to derive a signal upon each sweep of the oscillator-output frequency past the reference frequency $f_r$ selected by the filter 11; such a signal may be utilized to initiate the counting function, as has been functionally shown by the enabling connection 16 to a counter-control circuit 17 for the digital counter 18. The counter 18 may include a display window 19 within which will appear a given number representing the solution of the counting process.

Once the counter-control circuit has been enabled by a start-count impulse delivered in line 16, the counter-control circuit 17 may respond to all register impulses delivered in line 20. It will be understood that such register impulses may be derived in a manner analogous to derivation of the start-count impulse, as by connecting a mixer 21 to respond both to the sweep frequency $f_s$ of the oscillator 13 and to the full harmonic spectrum ($f_0 \ldots nf_0$) of generator 10.

The unknown or undetermined frequency $f_u$ may be applied to my frequency meter at a terminal 22 for direct connection to one side of a mixer 23, which is also responsive to the sweep frequency $f_s$ produced in the output of oscillator 13. Upon coincidence of the sweep frequency $f_s$ with the frequency $f_u$ of the unknown signal, the mixer 23 may generate a control impulse for stopping the count or for reading the count registered by the counter 18, as will be understood.

In Fig. 2, I have displayed a portion of the spectrum in which the unknown frequency $f_u$ occurs. In the case shown, the unknown frequency happens to occur at a point which fails to coincide with one of the harmonic frequencies in the spectrum produced by generator 10. In order to determine a reference frequency or harmonic near the unknown frequency $f_u$, I adjust the position of the knob 12 so that a reference frequency $f_r$ occurs in the general neighborhood of the unknown frequency; in the case shown, the reference frequency selected is 100 mc. In the normal automatic tuning cycle of the sweep-oscillator means 13—14, the entire (or a relatively large part of the) harmonic spectrum will be swept, but no count will be registered until the counter-control circuit 17 is enabled, upon coincidence of the sweep frequency $f_s$ with the reference frequency $f_r$. Thereafter, the counter-control circuit 17 may respond to all the register impulses produced upon sweeping the oscillator frequency $f_s$ past successive harmonic frequencies in the spectrum of generator 10. In the case shown in the drawings, the spaced frequency marks in the spectrum will be understood to be purely diagrammatic, in that too few are depicted on the present scale to provide any great number of significant figures in the count indication at window 19; but it will be understood, as suggested above, that the harmonic "marks" in the spectrum may be as close together as desired, depending upon the desired resolution of the system.

Upon coincidence of the sweep frequency $f_s$ with the unknown frequency $f_u$, an impulse will be generated by mixer 23 to stop further counting. The counter 18 will then display an indication of the difference between the single frequency selected by placement of knob 12 and the most recently swept harmonic frequency, that is, the harmonic swept just prior to coincidence with the unknown frequency $f_u$. If desired, interpretation of the counter reading may be facilitated by means of a mechanical connection, designated schematically by the dotted line 25, between the knob 12 and the counter-control circuit 17, so that all counts following an enabling of the counter-control circuit 17 may be added to a counter-display number representing the single reference frequency $f_r$ selected by the filter 11; the display at window 19 may then be direct-reading.

It will be understood that if it is desired to resolve the unknown frequency with finer detail, conventional methods of interpolation may be employed to determine the spectral placement of the unknown frequency between adjacent harmonic frequencies in the spectrum of generator 10.

As indicated generally above, my equipment may be further utilized for the generation of a selected secondary standard frequency, based on the harmonic output of the generator 10. In such applications, a fixed-count selector knob 26 may be employed in conjunction with the counter-control circuit 17 to select a given counting limit at which an enabling signal may be produced in an output line 27. Further, switches 28—29 (shown by a dashed-line interconnection to be mechanically ganged) may be closed to introduce an automatic-frequency-control circuit 30 into controlling relation with the oscillator 13, once activated by an enabling signal in line 27. If desired, a sweep-stopping relay or other means 31 may also respond to activation of the automatic-frequency-control circuit 30 for the positive stopping of further sweep tuning, so that the oscillator 13 may be more readily stabilized by the automatic-frequency-control circuit 30.

In operation as a secondary-frequency-standard source, the knob 26 may be turned until the desired source frequency is read on the counter display 19. The sweep-tuning means may then be activated so as to cause sweeping through the spectrum of generator 10. Upon passing the frequency selected by filter 11, the start-count impulse in line 16 will enable the counter-control circuit, and counting will proceed with each successive register impulse in line 20 until such time as the count selected by the knob 26 has been reached. Upon reaching the selected count, an impulse from circuit 17 will be delivered in line 27 to activate the automatic-frequency-control circuit 30, which may then respond to the particular harmonic frequency which caused such response. Activation of circuit 30 serves to stop further sweep tuning of the oscillator 13 and to slave the oscillator 13 to that particular harmonic frequency. The output of oscillator 13 may then be available at terminal 32 to provide the desired output signal.

As also indicated generally above, my equipment may be utilized as a means for stabilizing an external oscillatory circuit which it may be desired to tune to a selected secondary standard frequency. In such case, the output frequency of the external circuit may be applied as the unknown signal $f_u$ at terminal 22, and, once the oscillator 13 has been slaved to the automatic-frequency-control circuit 30, the mixer 23 may yield an error signal of frequency $f_e$ representing the instantaneous deviation of the externally generated frequency $f_u$ from the secondary-standard frequency then available as the oscillator frequency $f_s$. If desired, known means (not shown) may respond to the error-signal frequency $f_e$ to derive an error signal of magnitude proportional to frequency deviation from the standard frequency.

It will be appreciated that I have described a relatively simple frequency-standard control means having direct application to the metering of frequencies and to the generation of known frequencies for external comparison. My equipment may be based entirely upon a single crystal oscillator, and no point-by-point calibration procedures are required, as in present-day frequency meters.

While the invention has been described in considerable detail and a preferred form illustrated, it is to be understood that various changes and modifications may be made within the scope of the invention as defined in the appended claims.

I claim:

1. In a frequency-measuring device of the character indicated, a spectrum generator of harmonics of a reference frequency, frequency-responsive spectrum-probing means tunable over a band including a plurality of harmonics in the output of said generator, frequency-coincidence responsive means connected to said probing means and to said generator and generating an output signal for each frequency coincidence, counter means connected to said last-defined means and responsive to frequency coincidences between the output of said generator and of said probing means to count the number of such coincidences in a given tuning sweep of said probing means, and second frequency-coincidence responsive means connected to said probing means and including an input connection for application of a source of unknown frequency, said counter means being also connected to said second coincidence-responsive means and being further responsive to a frequency coincidence between a given unknown frequency and the output of said probing means to stop count registration upon such latter coincidence, whereby when said counter has been stopped it may preserve a response indicative of the particular harmonic frequency swept just before attainment of the unknown frequency.

2. In a frequency-measuring device of the character indicated, a spectrum generator of harmonics of a reference frequency, filter means connected to said generator and selecting a particular one of said harmonics, frequency-responsive spectrum-probing means tunable over a band including a plurality of harmonics in the output of said generator, first frequency-coincidence responsive means connected to said probing means and to said generator and generating an output count signal for each frequency coincidence, second frequency-coincidence responsive means connected to said probing means and to said filter means and generating an output control signal when said probing means sweeps the selected harmonic, third frequency-coincidence responsive means connected to said probing means and including an input connection for application of a source of unknown frequency and generating an output control signal when said probing means sweeps the unknown frequency, and counter means connected to all said coincidence-responsive means and counting the number of said count signals occurring between one and the other of said control signals.

3. A device according to claim 2, wherein said filter means includes a selectively variable tuning element for tuning to a selected one of said harmonics for any one of several selectively tuned conditions thereof.

4. A device according to claim 3, in which said counter means includes counter-control means, and means interlocking said tunable element and said counter-control means, whereby said counter may be direct-reading whatever the reference harmonic selected by said selector means.

5. A device according to claim 2, in which said generator includes a reference oscillator having a known base frequency, frequency-dividing means connected to said oscillator for deriving a submultiple of said base frequency, and harmonic-generating means connected to said dividing means for deriving a spectrum rich in harmonics of said submultiple frequency.

6. In a frequency-measuring device of the character indicated, a spectrum generator of harmonics of a reference frequency, selector means connected to said generator and selecting a particular one of said harmonics, a tunable oscillator and means for sweeping the tuned frequency thereof over a band of said harmonics including said one harmonic, frequency-coincidence means connected to said oscillator and to said selector means and to said generator and including an input connection for application of a source of unknown frequency, said last-defined means generating separate count signals upon coincidence of the instantaneous oscillator frequency with harmonics in said band and also generating separate control signals upon coincidence of the instantaneous oscillator frequency with said selected one harmonic and with said unknown frequency, and counter means connected to said frequency-coincidence means and responsive to said respective control signals to count the number of said count signals occurring between said control signals for a given sweep of said oscillator.

7. A device according to claim 6, in which said counter means includes digital-display means.

References Cited in the file of this patent
UNITED STATES PATENTS

| | | |
|---|---|---|
| 2,337,328 | Hathaway | Dec. 21, 1943 |
| 2,490,404 | Bliss | Dec. 6, 1949 |
| 2,490,500 | Young | Dec. 9, 1949 |
| 2,510,381 | Cushing | June 6, 1950 |
| 2,523,106 | Fairbain | Sept. 19, 1950 |
| 2,539,673 | Peterson | Jan. 30, 1951 |
| 2,632,036 | Hurvitz | Mar. 17, 1953 |